United States Patent [19]

Medwed

[11] 4,397,804
[45] Aug. 9, 1983

[54] METHOD FOR PRODUCING CONTAINERS FROM THERMOPLASTIC SHEET MATERIAL

[75] Inventor: Emmerich Medwed, Wolfertschwenden, Fed. Rep. of Germany

[73] Assignee: Multivac Sepp Haggenmüller KG, Wolfertschwenden, Fed. Rep. of Germany

[21] Appl. No.: 242,356

[22] Filed: Mar. 10, 1981

[30] Foreign Application Priority Data

Mar. 14, 1980 [DE] Fed. Rep. of Germany ... 8007086[U]

[51] Int. Cl.³ .............................................. B29C 17/04
[52] U.S. Cl. ................... 264/292; 264/522; 264/549; 264/550; 425/387.1; 425/388
[58] Field of Search ................. 264/522, 549–551, 264/292; 425/387.1, 388

[56] References Cited

U.S. PATENT DOCUMENTS 3,121,767 2/1964 Welshon .
3,482,281 12/1969 Thiel ............................... 425/388 X
3,966,860 6/1976 Hudson et al. ................. 425/388 X
4,155,697 5/1979 Gordon et al. ..................... 425/535

FOREIGN PATENT DOCUMENTS 1479085 2/1969 Fed. Rep. of Germany .
2321980 11/1974 Fed. Rep. of Germany .
1238405 7/1960 France .
2026918 9/1970 France .

*Primary Examiner*—Jan H. Silbaugh
*Attorney, Agent, or Firm*—Donald Brown

[57] ABSTRACT

A method of and an apparatus for producing containers from thermoplastic sheet material are disclosed. The sheet material is heated to its plastic state and clamped at its periphery. Then a moulding die is advanced substantially normally towards and against the clamped heated sheet material. The moulding die has a temperature below the temperature of the heated clamped sheet material and is provided with a projecting peripheral portion and/or a recessed central portion directed towards the sheet material. By further advancing the moulding die by a predetermined amount against the sheet material, this is deformed and shaped into the desired container. A cooling air flow is directed against the clamped heated sheet material in a region thereof adjacent to the peripheral portion of the moulding die to avoid reduced wall thickness at the edge and corner regions of the container by excessive stretching of the sheet material. Thus, stable containers of uniform wall thickness may be produced.

2 Claims, 6 Drawing Figures

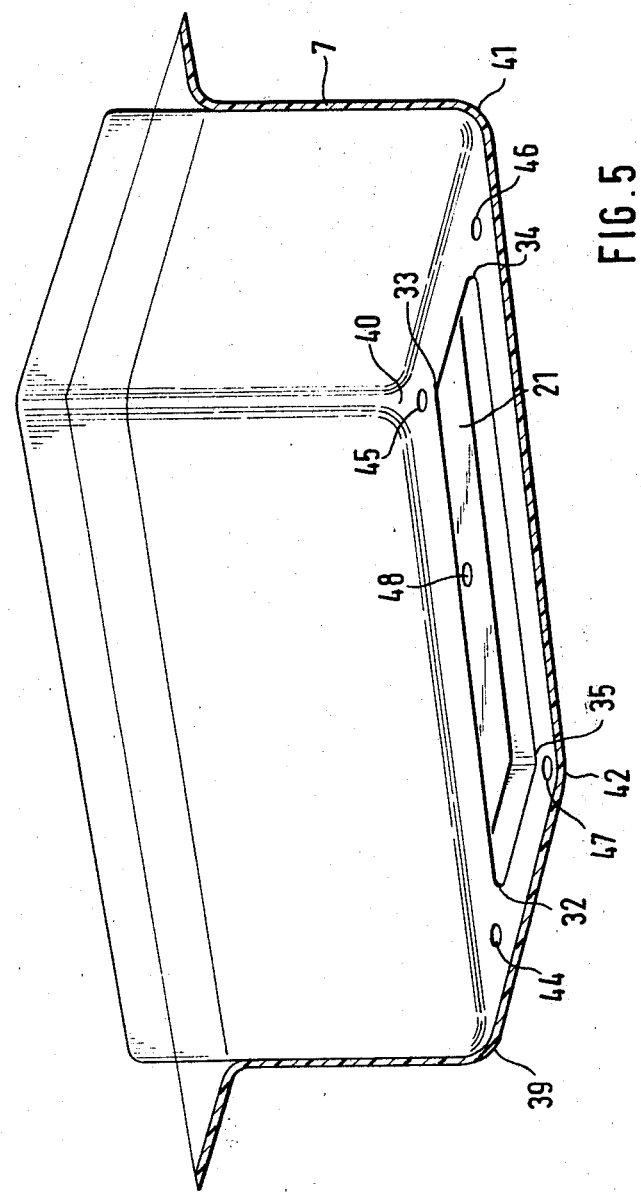

METHOD FOR PRODUCING CONTAINERS FROM THERMOPLASTIC SHEET MATERIAL

BACKGROUND OF THE INVENTION

This invention relates to a method of producing containers, more particularly producing containers from thermoplastic sheet material for packaging purposes. Containers of this kind are especially used for packaging food.

For producing containers of thermoplastic sheet material a molding die is used which is advanced towards and against a heated sheet material which is clamped at its periphery to be in a generally flat state. Conventional molding dies have a raised or projecting peripheral portion and a recessed central portion so that the containers formed thereby will have a recessed bottom. On its bottom side directed towards the sheet material, the molding die has preferably rounded edges, just as on the edge portion of the side walls adjacent the bottom. For shaping the preheated sheet material or foil, the molding die is substantially normally moved towards the sheet material or foil towards a container the shape of which corresponds to the shape of the molding die. Those portions of the sheet material or foil which are first to contact the molding die are cooled by transmission of heat to the molding die the temperature of which is below the temperature of the plastic state of the thermoplastic sheet material. Thus, those portions not contacting the surface of the molding die at the time a first contact is made will be stretched more than other portions. The stretching effect will be maximum at the edges, particularly at any corners to be formed in the container. The edge and corner portions of the containers are thus formed with reduced thickness, and this is undesirable in view of producing stable containers.

OBJECTS OF THE INVENTION

A primary object of the invention is to provide a method and an apparatus for producing containers from thermoplastic sheet material which are substantially free from undesirably stretched and thinned wall portions.

A further object of the invention is to provide a method and an apparatus for producing containers from thermoplastic sheet material having an improved rigidity.

A further object of the invention is to provide a method and an apparatus for producing containers from thermoplastic sheet material using a molding die, the containers having edge and corner portions of appropriate thickness to achieve satisfactory rigidity.

A further object of the invention is to provide a method and an apparatus for producing containers from thermoplastic sheet material which have a substantially uniform wall thickness, not only in the side walls but also in the edge and corner portions.

SUMMARY OF THE INVENTION

In accordance with the invention, containers are produced from a thermoplastic sheet material which is heated to its plastic state. The heated sheet material is clamped at its periphery, and a molding die is advanced against the sheet material for shaping of the same into containers. The molding die has a projecting peripheral portion and/or a recessed central portion directed towards the sheet material. In order to prevent undue stretching of the sheet material in the edge and corner portions of the container to be formed, a cooling air flow is directed against the sheet material at the region thereof adjacent to the peripheral portion of the molding die, i.e. adjacent the corner and edge portions to be formed.

The invention provides an apparatus for performing the method, having a molding die of the above mentioned type and being provided with cooling air flow channels or bores through which the cooling air flow may be directed against the appropriate regions of the sheet material. In addition, the molding die is provided with a venting channel centrally displaced from the cooling air flow channels to draw the cooling air towards the center portion of the bottom of the molding die and finally vent the air to the environment.

In a preferred embodiment, the contacting surface of the molding die is provided with a coating of felt material, and this coating is provided with openings at the locations corresponding to those of the different channels and bores of the molding die.

DESCRIPTION OF PREFERRED EMBODIMENTS

Further advantageous features and objects of the invention will stand out from the following description of examplary embodiments with reference to the drawings, wherein:

FIG. 5 shows a molding die provided for the embodiment of FIG. 4; and

Figure 1:
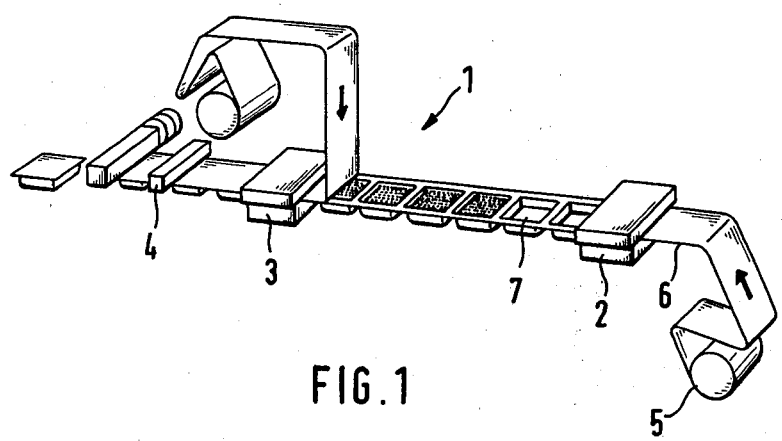
FIG. 1 is a schematic perspective view of a packaging machine in which the method is performed.

Referring to FIG. 1, a vacuum packaging machine 1 has in succession a molding station 2, a sealing station 3 and a separating station 4 mounted on a machine frame (not shown). In the forming station 2, containers 7 are formed of a packaging material foil or sheet material 6 drawn from a roll 5 of stock material. The containers are then filled and closed by a cover foil in the sealing station. In the separating station, the individual interconnected packages are separated from each other.

Figure 2:
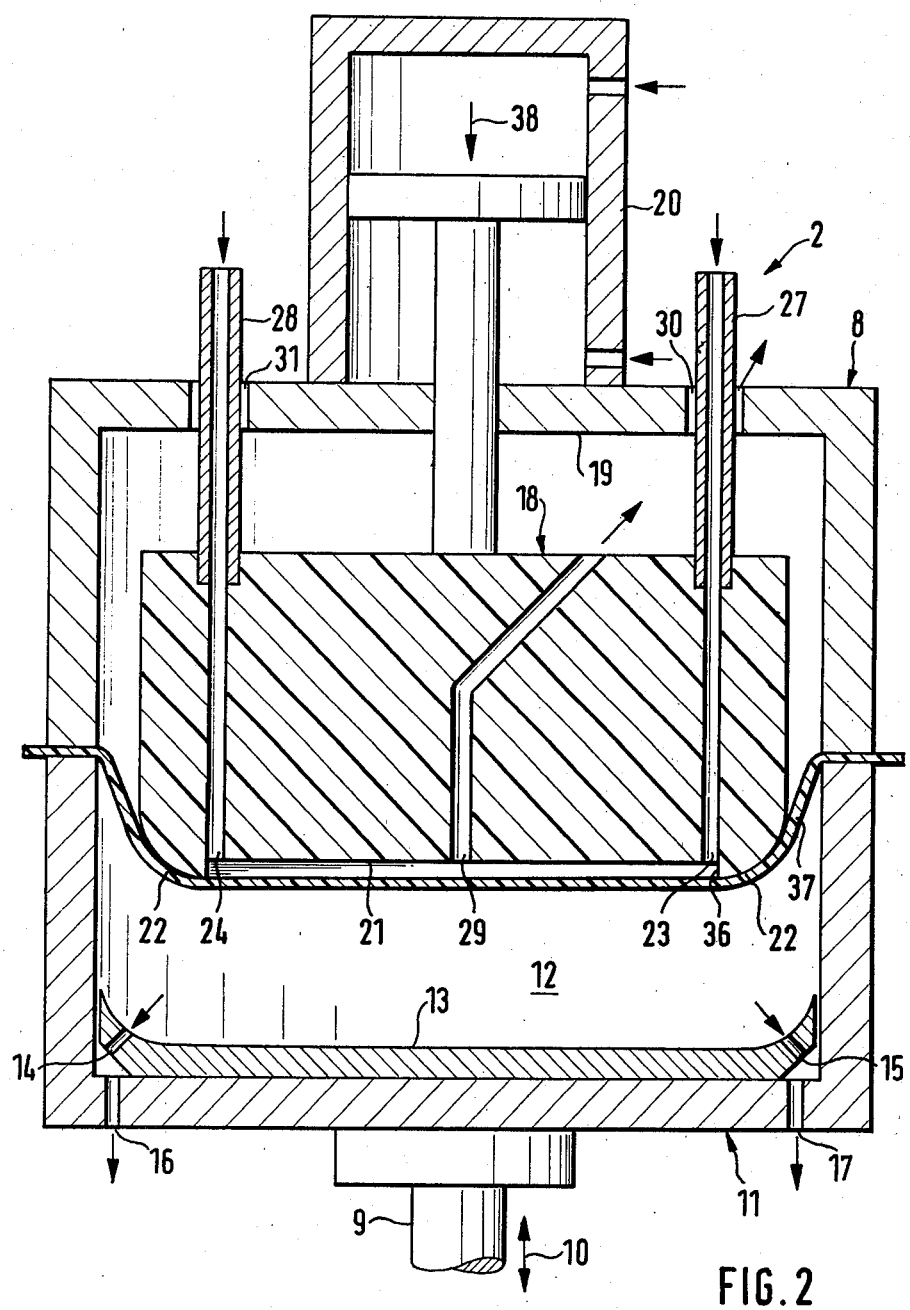
FIG. 2 is a cross-section of a molding station in the packaging machine of FIG. 1, having a device for performing the method.

FIG. 2 shows the molding station 2 schematically indicated at FIG. 1 in cross-section. It has an upper portion 8 secured on the machine frame (not shown) and a lower portion 11 connected with the machine frame and movable with respect to the upper portion in direction of arrow 10.

The lower portion 11 has an inner space 12 into which molding inserts 13 are inserted, in accordance with the shape of the containers to be formed. The inner space 12 is connected with a vacuum pump through bores 14, 15 provided in the molding inserts of the containers to be formed, particularly at the edge regions and corners, and through connections 16, 17 leading towards the vacuum pumps.

The upper portion is provided with a molding die 18 which may be reciprocated up and down into the inner space 12 of the lower portion and into a retracted position remote therefrom, by a piston cylinder device 20 connected with a casing 19 of the upper portion. As may be best seen from FIG. 3, the molding die has a central portion 21 at its bottom and a peripheral portion 22 raised over or projecting from the central portion. The peripheral portion has the dimension of the shape to be formed by the molding die in a deep-drawing operation. The central portion 21 is recessed with respect to the peripheral portion by an amount sufficient that the foil or sheet material will not contact the surface of the molding die in this region, during the molding operation.

In the central portion, particularly in the corners thereof, bores 23, 24, 25, 26 are provided which, as seen from FIG. 2, are connected with a pressurized air source (not shown) through connecting members 27, 28 provided at the top side of the molding die. Centrally of the central portion 21, a venting bore 29 is provided in the molding die. The connecting members 27, 28 are free to be receiprocated through openings 30, 31 in the casing, and the air escaping through the venting bore 21 may escape to the environment through these openings.

Figure 3:
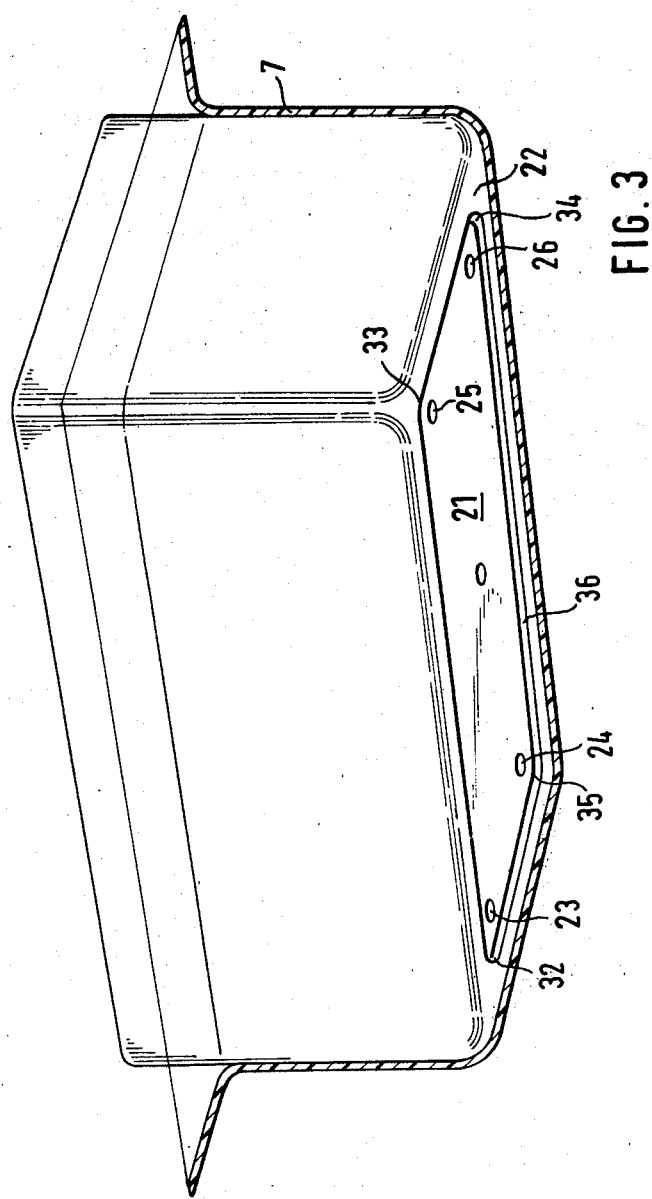
FIG. 3 is a perspective view of a molding die and a container molded thereby.

In FIG. 3, the bores 23 through 26 are provided near the corners 32, 33, 34, 35. Preferably, as shown in FIG. 2, they are arranged in the corners and as close as possible to the inner edge 36 surrounding the central portion 21.

As may be seen in the representation of FIG. 2, the outer dimensions of the molding die 18 are somewhat smaller than the dimensions of the hollow space defined by the molding insert 13 and the side walls.

The device operates as follows: The lower portion 11 is first moved by the piston cylinder device 9 downwardly so that a container formed in the preceding operating cycle will be moved out of the molding station. Simultaneously, a new heated and not yet shaped foil portion 37 is introduced into the molding station. The molding die is in its retracted position so that it will not contact the foil portion 37. Subsequently, the lower portion 11 will be moved by the piston cylinder device 9 into the closed position shown in FIG. 2 towards the upper portion, clamping the foil portion 37 at its four sides between the upper and lower portions. During a preceding operating cycle in another part of the molding station, or in an individual heating station, the foil portion 37 had been preheated to its temperature for plastic deformability. After clamping of the foil or sheet material, the molding die 18 is moved by the piston cylinder device 20 in the direction of arrow 38 towards the foil and against the same into the lower portion 11. The molding die 18 will first contact the preheated foil through its peripheral portion 22. The molding die may e.g. be formed of laminated cloth such as sold under the trade name FERROCELL. By contacting the molding die, the portions in contact therewith will immediately transmit heat thereto. As a result, these zones which are somewhat cooled will be less deformed than those over the recessed central portion 21. Upon further pushing the molding die downwardly, those cooled portions will be less stretched, and a particularly heavy stretching of the foil would result over the central portion immediately adjacent the corners 32, 33, 34, 35. In accordance with the invention, when the molding die 18 is pushed down, an air stream is directed against the foil in the corners of the central portion, through the bores 23, 24, 25, 26. This air will flow from the corners towards the center of the central portion and escapes through the venting bore 29. Thus, the foil will be cooled across the central portion adjacent the portion thereof already cooled by contacting the molding die. The limit between the cooled foil and the heated foil which would otherwise be marked, will now be more continuous. The cooling will be maximum in the corners of the central portion thermselves. It decreases towards the center of the central surface. As a result, upon further advancement of the molding die into the lower portion into the end position, although most of the stretching of the foil will occur in the central region, the corner portions (which would be subject to heavy stretching without cooling) will not be stretched more than the other regions, due to the maximum cooling. The temperature of the supplied air and the pressure thereof are adjusted in such a manner that the cooling will be performed to such an extent that the corners will have the same wall thickness as the wall portions of the containers.

When the molding die is moved to its end position in the lower portion, the deep-drawn foil portion 37 is almost applied against the molding insert 13, but it will have somewhat smaller dimensions than the final shape. To this end, by actuating a vacuum pump and generating a vacuum through the connections 16, 17 and the bores 15, 14, the foil will be sucked to the walls of the lower portion to assume the final dimensions. Then, the container will have an essentially stable shape. The molding die will be retracted into the upper portion. Subsequently, the lower portion will be moved downwardly, and the next operating cycle may be begin.

Figure 4:
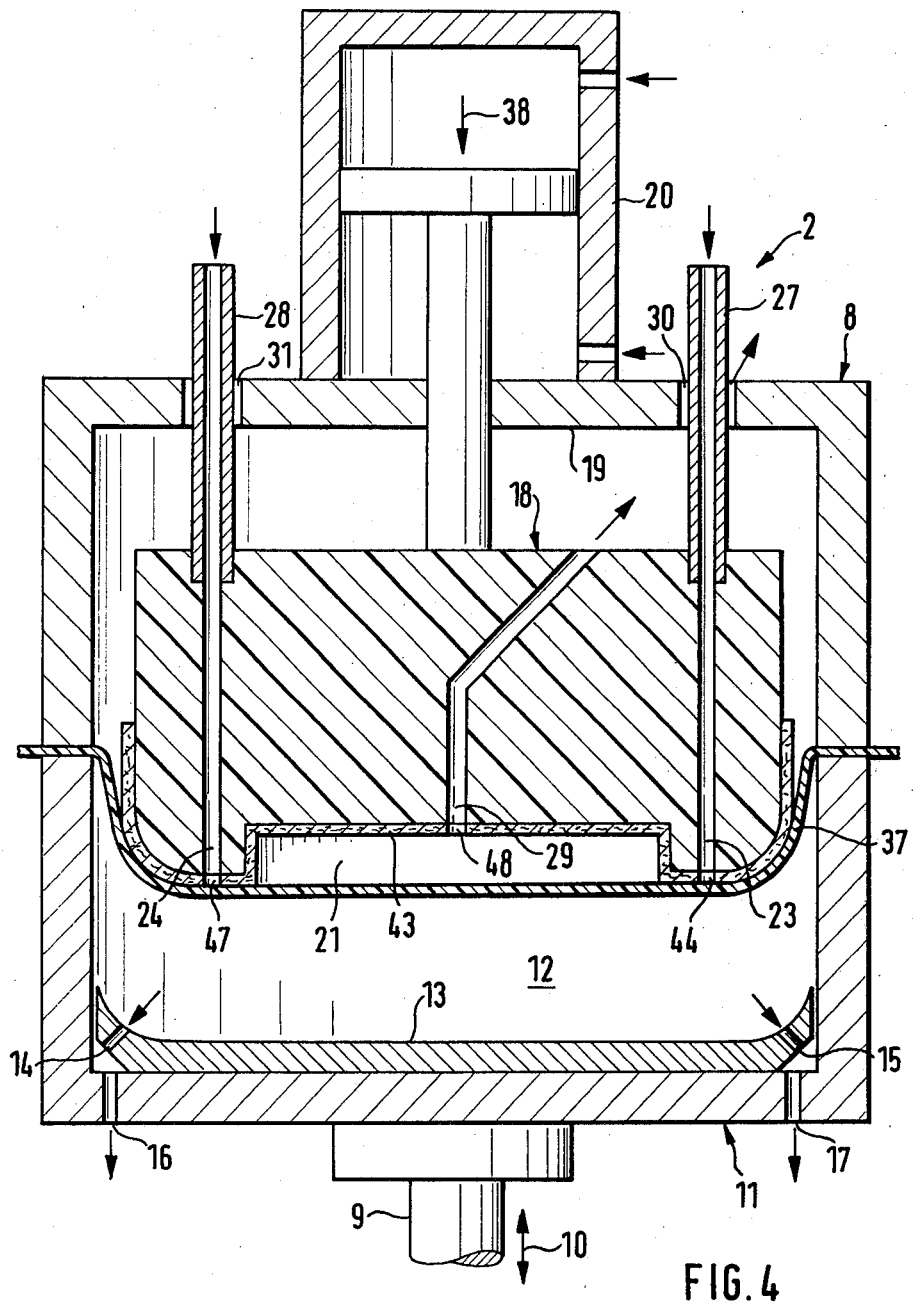
FIG. 4 shows a sectional view similar to FIG. 2, but of another embodiment.

In the embodiment of FIGS. 4 and 5, those features similar to the above enclosed embodiments are indicated by the same numerals. The embodiment of FIGS. 4 and 5 differs from the above disclosed embodiment by the fact that the ends of the bores 23, 24, 25, 26 are displaced from the central zone 21 towards the corners 39, 40, 41, 42 of the molding die 18 so that they lie between the corners 32, 33, 34, 35 of the central portion 21 and the above mentioned corners of the molding die, as best seen in FIG. 5. Further, the surface directed towards the foil portion 37 is covered with a felt coating 43. The shape of the felt coating 43 is adapted to the outer shape of the molding die. In the embodiment of FIGS. 4 and 5, the felt coating 43 is provided with openings 44, 45, 46, 47 at locations corresponding to the bores 23 through 26, so that the air supplied through the connecting members and the bores may escape from the felt. Further, the felt coating 43 is provided with an opening 48 at a location corresponding to the venting bore 29 so that the air is free to escape from the central portion towards the environment through the venting bore 29.

The operation of the device for deep-drawing a foil is the same as disclosed above. The air escaping from the holes 44 through 47 will even come closer to the corners 39 through 42 of the molding die 18 than with the previously described embodiment, and will pass between the felt coating 43 and the foil portion and arrive at the central portion 21 to escape through opening 48 and the venting bore 29. This will result in having a progressive cooling of the progressively deep-drawn foil from the corners towards the central portion. As soon as the foil arrives in the corners, it will be cooled to such an extent that the stretching thereof will not be stronger than in other regions. The felt coating will, on the one hand, prevent the foil from being damaged when passing over the outlet openings 44 through 47 and, on the other hand, provide a certain distribution of the introduced air by the porosity of the felt.

Figure 6:
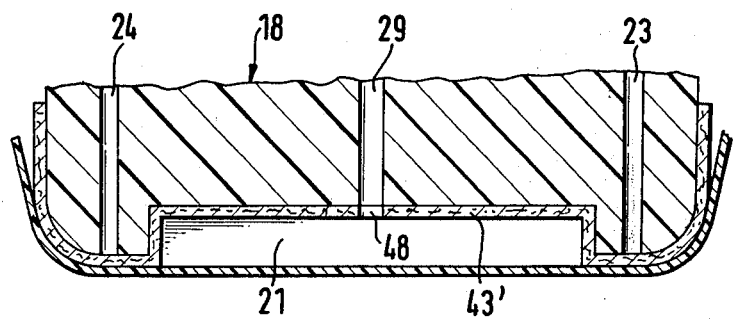
FIG. 6 shows a sectional view of the embodiment of FIG. 5.

In FIG. 6, only the lower part of the molding die 18 is shown in cross-section similar to FIG. 4. The molding die 18 corresponds to the embodiment of FIGS. 4 and 5. Only the felt coating 43' differs from the previously described felt coating or covering by the fact that no openings 44 through 47 are provided. The air supplied through the bores 23 to 26 will be fed under pressure through the felt cover. Thus, the air will not locally escape from the bores 23 through 26, but rather escape through surface regions from the felt cover. Just as with the previously disclosed embodiment, the air will flow towards the central portion 21 and escape through the opening 48 and the venting bore 29 to the environment.

In the above disclosed embodiment, the cover or coating 43 is made of felt. The thickness of the felt is selected in such a manner that the felt cover will be sufficiently stable and that, on the other hand, the air may sufficiently pass therethrough and be distributed in such a manner that the corner portions are sufficiently cooled. For example, the felt cover may be attached to the molding die by an adhesive. Instead of a felt material the cover or coating may be formed of another material having similar properties.

It should be understood that the present invention is in no way limited to the above disclosed embodiments and that many modifications and improvements may brought thereto without departing from the true spirit of the invention.

What is claimed is:

1. A method of producing a container having corner portions from thermoplastic sheet material, comprising the steps of:
    heating said sheet material to its plastic state;
    clamping said heated sheet material on at least two opposed sides thereof;
    advancing a molding die substantially normally towards said clamped heated sheet material, said molding die having a temperature below the temperature of said heated clamped sheet material and presenting a projecting peripheral portion and/or a recessed central portion directed towards said sheet material;
    deforming said clamped heated sheet material by further advancing said molding die by a predetermined amount to shape said sheet and form said container; and, during said deforming, directing a stream of cooling air flow against said clamped heated sheet material from a region thereof adjacent to said peripheral portion of said molding die directed to the inner region of the said central portion to cool said sheet material adjacent said corner portions to be formed and progressively toward said central portion and thereby avoid excessive stretching and reduced wall thickness in said portions.

2. The method of claim 1, wherein said cooling air flow is directed from corner portions of said peripheral portion towards said central portion and is then carried off from said central portion by a venting bore in said molding die in said central portion.

* * * * *